United States Patent

Donahoe et al.

[11] Patent Number: 6,129,527
[45] Date of Patent: Oct. 10, 2000

[54] ELECTRICALLY OPERATED LINEAR MOTOR WITH INTEGRATED FLEXURE SPRING AND CIRCUIT FOR USE IN RECIPROCATING COMPRESSOR

[75] Inventors: Thomas S. Donahoe; Arthur Randall Nelson, both of Davenport, Iowa

[73] Assignee: Litton Systems, Inc., Woodland Hills, Calif.

[21] Appl. No.: 09/292,984

[22] Filed: Apr. 16, 1999

[51] Int. Cl.[7] .............................. F04B 17/04; F04B 35/04
[52] U.S. Cl. ............................................ 417/416; 417/418
[58] Field of Search .................................... 417/416, 418, 417/417, 383, 45; 310/15; 62/228.1, 228.6; 318/135

[56]  References Cited

U.S. PATENT DOCUMENTS

| | | |
|---|---|---|
| 3,910,729 | 10/1975 | Jepsen et al. . |
| 4,067,667 | 1/1978 | White ...................................... 417/418 |
| 4,179,630 | 12/1979 | Stuber ........................................ 310/15 |
| 4,353,220 | 10/1982 | Curwen et al. .......................... 62/228.1 |
| 4,389,849 | 6/1983 | Gasser et al. . |
| 4,713,939 | 12/1987 | Keith . |
| 4,750,871 | 6/1988 | Curwen ................... 417/418 |
| 4,781,546 | 11/1988 | Curwen ................... 417/417 |
| 4,836,757 | 6/1989 | Curwen ................... 417/416 |
| 4,872,313 | 10/1989 | Kazumoto et al. . |
| 5,032,772 | 7/1991 | Gully et al. .............................. 318/135 |
| 5,257,915 | 11/1993 | Laskaris et al. . |
| 5,261,799 | 11/1993 | Laskaris . |
| 5,275,542 | 1/1994 | Terauchi .................................. 417/417 |
| 5,318,412 | 6/1994 | Laskaris et al. . |
| 5,492,313 | 2/1996 | Pan et al. . |
| 5,522,214 | 6/1996 | Beckett et al. . |
| 5,603,612 | 2/1997 | McGrath ................... 417/417 |
| 5,645,407 | 7/1997 | Kralick ..................... 417/383 |
| 5,647,217 | 7/1997 | Penswick et al. . |
| 5,779,455 | 7/1998 | Steiger .................... 417/418 |
| 5,980,211 | 11/1999 | Tojo et al. ................ 417/45 |

OTHER PUBLICATIONS

"Design Equations and Scaling Laws for Linear Compressors with Flexure Springs", by E. Marquardt, et al., Proceedings of the 7th International Cryocooler Conference, Nov. 17–19, 1992.

"Novel Linear Flexure Bearing", by T.E. Wong et al., Proceedings of the 7th International Cryocooler Conference, Nov. 17–19, 1992.

Primary Examiner—Teresa Walberg
Assistant Examiner—L Fastovsky
Attorney, Agent, or Firm—Lowe Hauptman Gopstein Gilman & Berner

[57] ABSTRACT

A reciprocating compressor includes an electric motor having fixed and moveable components within a housing for reciprocating a moveable assembly, to compress a working fluid within a variable volume compression chamber within the housing. An integrated flexure spring and circuit connected between the housing and the moveable assembly axially and radially centers the moveable assembly within the housing, and additionally, supplies an electric current to a moveable current coil of the electric motor associated with the moveable assembly. The moveable assembly is axially reciprocated against a restoring force of the integrated flexure spring and circuit responsive to an axial force exerted on the moveable assembly by the electric motor when the electric current is supplied to the moveable current coil via the integrated flexure spring and circuit.

28 Claims, 7 Drawing Sheets

ELECTRICALLY OPERATED LINEAR MOTOR WITH INTEGRATED FLEXURE SPRING AND CIRCUIT FOR USE IN RECIPROCATING COMPRESSOR

FIELD OF THE INVENTION

The present invention generally relates to motors having reciprocating shafts and, more particularly, to a reciprocating compressor having an electrically operated linear motor using an integrated flexure spring and circuit.

BACKGROUND OF THE INVENTION

Long-life, high reliability cryogenic refrigerators or cryocoolers such as long-life Stirling and pulse tube refrigerators are used in cooling applications including infrared sensor systems on aircraft and spacecraft. Such cryocoolers typically include a linear-resonant or reciprocating compressor having a linear electric motor to compress and displace a refrigerant working fluid. The linear motor includes a moveable, current-carrying coil, i.e., a moveable current coil, within a magnetic field to impart reciprocating, bi-directional linear forces in an axial direction to a moveable assembly of the linear motor. As the moveable assembly reciprocates in response to the linear forces applied thereto, the working fluid is compressed and displaced toward system components associated with the refrigeration process.

Figure 1:
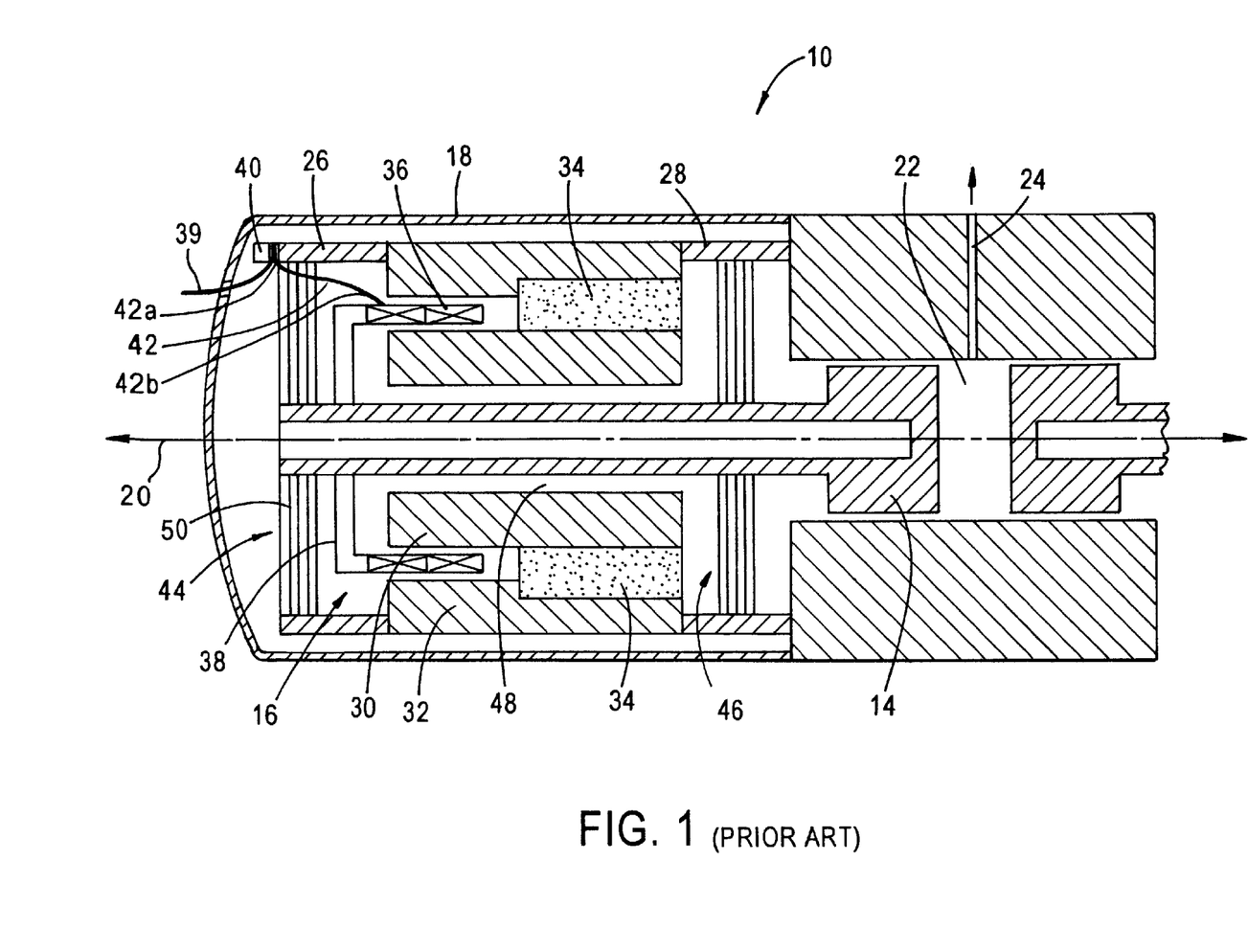
FIG. 1 is a cross-sectional longitudinal view of a prior art reciprocating compressor having flexure bearings.

FIG. 1 is an illustration of a reciprocating compressor 10 which is disclosed in the publication "Design Equations And Scaling Laws For Linear Compressors With Flexure Springs", by E. Marquardt, R. Radebaugh and P. Kittel, Proceedings of the $7^{th}$ International Cryocooler Conference, pp. 783, 17–19, November 1992. In FIG. 1, a left half (which is a mirror image of the right half) of reciprocating compressor 10 is depicted comprising a piston 14 driven by a linear motor, generally indicated at 16, within a pressurized motor housing 18. Piston 14 is displaced by linear motor 16 in opposing axial directions along a longitudinal axis 20 to compress a typically gaseous working fluid within a chamber 22 and to displace the working fluid through a discharge passageway 24.

In more detail, a stationary portion of linear motor 16 is fixed within motor housing 18 between a tubular left housing mount 26 and a tubular right housing mount 28. Linear motor 16 includes an outer return iron 32 fixed between mounts 26,28, and an inner return iron 30 positioned concentrically relative to outer return iron 32. A permanent magnet 34 is fixed between return irons 30,32. A moveable current coil 36, carried by a moveable armature 38 fixed to piston 14, is disposed between return irons 30,32.

An electrical outer lead 39 supplies a motor drive current from an external current source (not shown) to moveable current coil 36 through an electrical terminal 40 fixed to left housing mount 26 and a flexible inner lead 42, connected between the electrical terminal 40 and the moveable current coil 36. During motor operation, moveable current coil 36 is axially reciprocated by a magnetic force arising from magnetic interaction between moveable current coil 36, permanent magnet 34 and return irons 30,32. As moveable current coil 36 reciprocates, a moveable end 42b of inner lead 42 attached to the moveable current coil experiences corresponding movement while an opposite end 42a of inner lead 42 remains fixed to stationary terminal 40. This repetitive differential motion between fixed and moveable ends 42a, 42b disadvantageously causes bending of inner lead 42 along its length which fatigues both inner lead 42 and its terminal connections to terminal 40 and moveable current coil 36. The terminal locations are especially vulnerable to fatigue failure since stresses within reciprocating compressor 10 tend to concentrate at the terminal locations.

Figure 2A:
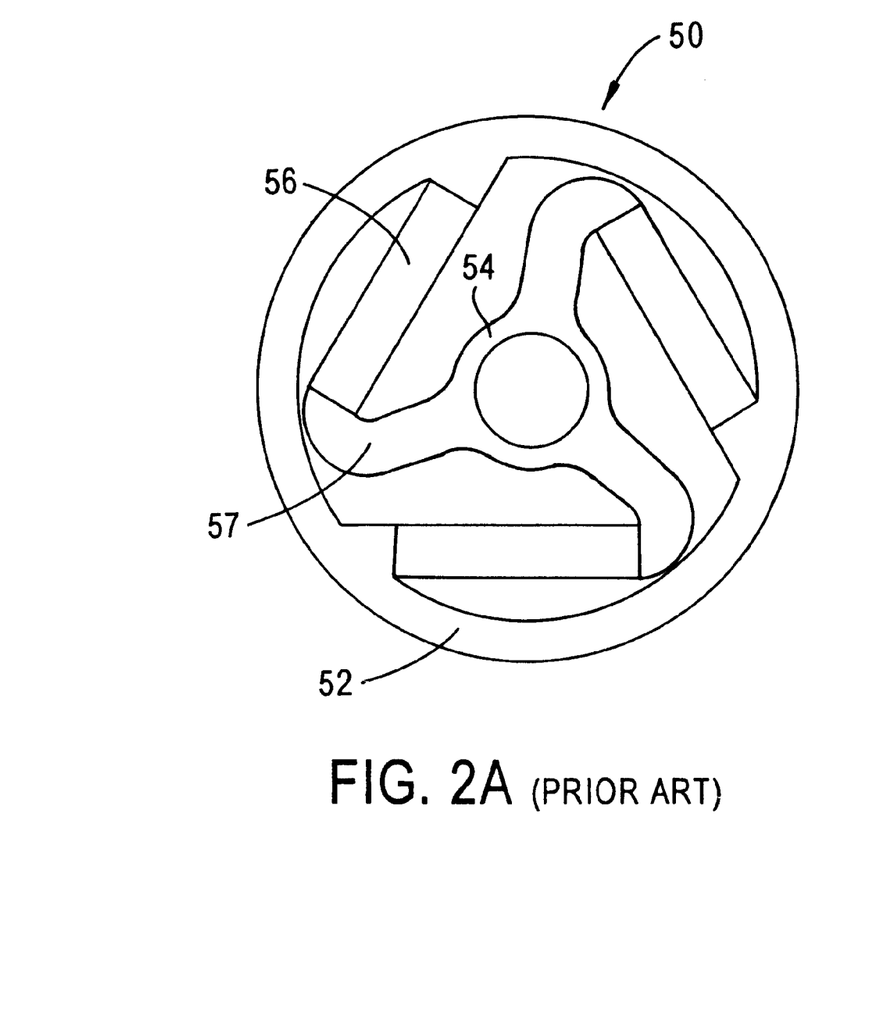
FIG. 2A is an elevational front view of a prior art flexure spring used in the reciprocating compressor of FIG. 1.
Figure 2B:
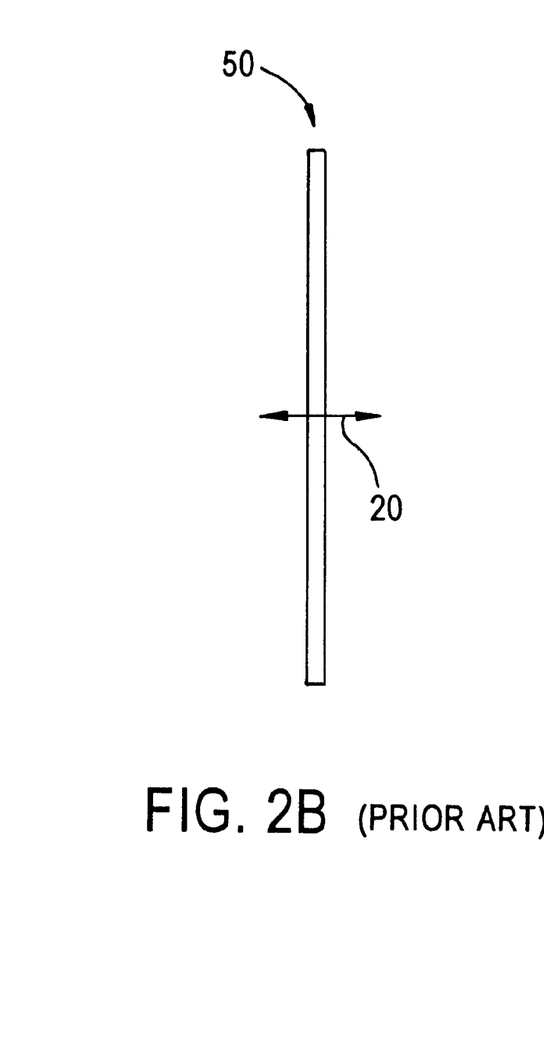
FIG. 2B is an elevational side view of the prior art flexure spring of FIG. 2A.

A pair of internally mounted flexure bearing assemblies 44,46 are respectively attached to mounts 26,28 to operatively center piston 14 as well as moveable coil 36 and armature 38 within the motor housing 18. With reference to FIGS. 2A and 2B, each of the flexure bearing assemblies 44,46 includes a planar or flat flexure spring 50 that comprises an annular outer rim 52 attached to an inner periphery of an associated one of mounts 26,28, an annular inner hub 54 through which an end of piston 14 extends, and at least one resilient support arm 56 coupled between outer rim 52 and inner hub 54 through spokes 57 formed integral with the inner hub 54.

Other prior art reciprocating compressors utilize plural electrically conductive coil springs, typically four to twelve, for both supplying a motor drive current to the linear motor and aligning the moveable assembly within the compressor. In miniature cryogenic cooler applications, these coil springs must be manufactured to very close tolerances to ensure the proper operation of the linear motor. Disadvantageously, the uncompressed length of each coil spring must be several times the displacement of the moveable assembly in order to keep cyclic stresses in the coil springs to within acceptable limits. In linear motors that use a large number of springs, manufacturing cost and complexity becomes significant. In addition, although these coil springs axially center the moveable assembly, they provide negligible radial support, necessitating other means for radially centering the moveable assembly, such as a guide-pin.

Figure 3:
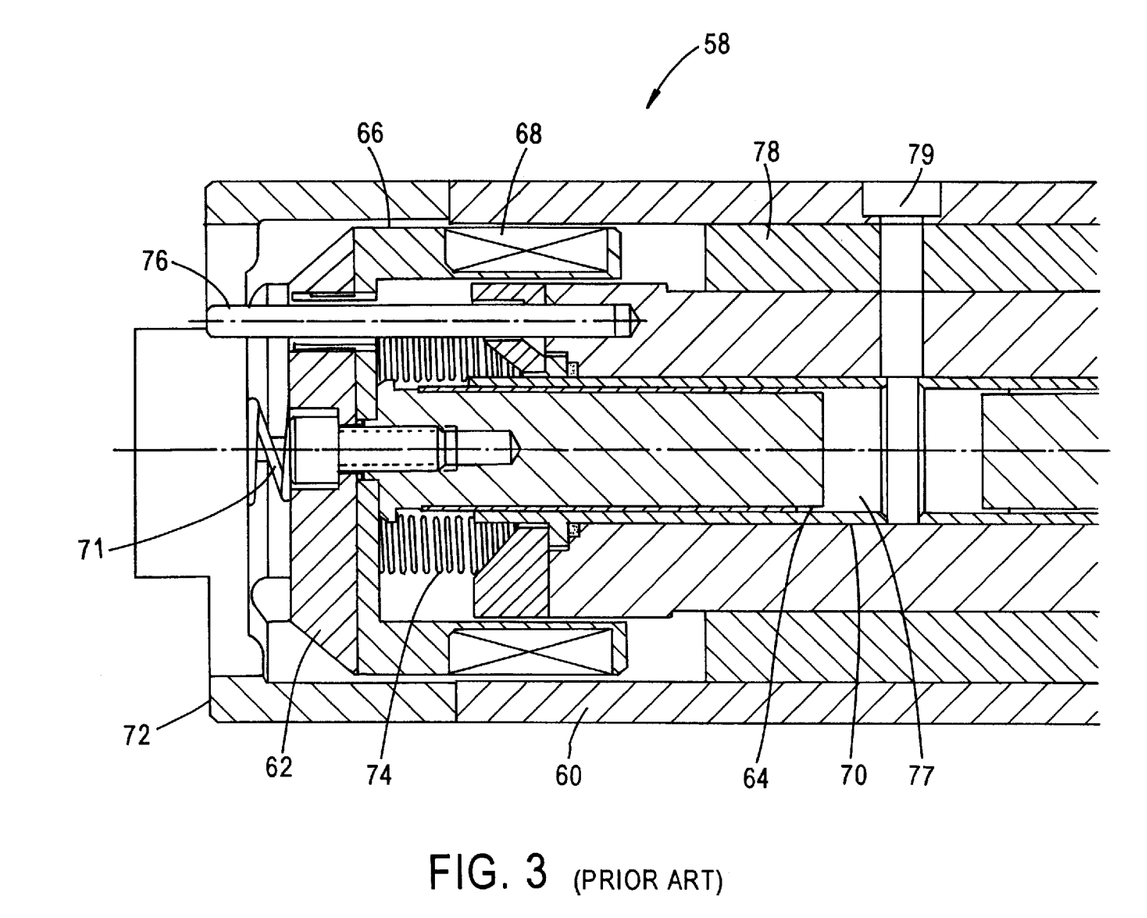
FIG. 3 is a cross-sectional longitudinal view of a prior art reciprocating compressor having electrically conductive coil springs.

Another prior art reciprocating compressor 58 is depicted in FIG. 3, wherein a moveable assembly is axially reciprocated within a housing 60 by a linear motor. The moveable assembly includes a moveable mount 62 axially moveable within housing 60, a piston 64 fixed to a center of the moveable mount 62, and an armature 66 fixed to an edge of the moveable mount 62 and carrying a moveable current coil 68 concentric to the piston 64. A cylinder 70 fixed and centered within housing 60 is concentric to piston 64. A plurality of electrically conductive coil springs 71, typically four, retained between moveable mount 62 and an end 72 of housing 60, provide axial alignment of the moveable assembly within housing 60. A plurality of inner coil springs 74, typically four, assist in this axial alignment of the moveable assembly, and additionally provide a small measure of radial support therefore. A guide pin 76 constrains the moveable assembly from rotation about a longitudinal axis of the compressor. The linear motor for reciprocating the moveable assembly includes moveable current coil 68 and permanent magnet 78 fixed within the housing proximate moveable current coil 68. To operate the linear motor, drive current is supplied to moveable current coil 68 through the electrically conductive coil springs 71. Reciprocation of piston 64 compresses a working fluid within a compression space 77 to displace the working fluid through a discharge passageway 79.

One notable advantage of the flexure spring of FIG. 1 over the conductive coil springs of FIG. 3, is the ability of the flexure spring to both axially and radially align the moveable assembly of the reciprocating compressor.

Accordingly, in a reciprocating compressor, it is desirable to properly locate the moveable or reciprocating assembly within the motor housing, both axially and radially, without resorting to a plurality of conductive coil springs and a separate radial alignment mechanism.

It is also desirable to couple the electric current for driving the linear motor from an external source to an electrical terminal of a moveable coil of the linear motor within the motor housing, without resorting to a plurality of conductive coil springs or to failure prone electrical leads and lead connections.

SUMMARY OF THE INVENTION

It is therefore an object of the present invention to both axially and radially center a moveable assembly within a housing of a reciprocating compressor with an integrated flexure spring and circuit.

Another object of the present invention is to supply an electric current to a moveable current coil of a linear motor within a housing of a reciprocating compressor with an integrated flexure spring and circuit.

A further object of the present invention is to provide at least two electrically isolated current paths between an external source of electrical current and a moveable current coil of a linear motor within a housing of a reciprocating compressor with an integrated flexure spring and circuit.

These and other objects of the present invention are achieved by a new and improved reciprocating compressor including an electric motor having fixed and moveable components within a housing for reciprocating a moveable assembly, to compress a working fluid within a variable volume compression chamber within the housing. Advantageously, an integrated flexure spring and circuit connected between the housing and the moveable assembly axially and radially centers the moveable assembly within the housing, and additionally, supplies an electric current to a moveable current coil of the electric motor associated with the moveable assembly. The moveable assembly is axially reciprocated against a restoring force of the integrated flexure spring and circuit responsive to an axial force exerted on the moveable assembly by the electric motor when the electric current is supplied to the moveable current coil via the integrated flexure spring and circuit.

The integrated flexure spring and circuit includes a substantially planar, resilient flexure spring having an outer rim, an inner hub and a resilient support member coupled between the outer rim and the inner hub. Advantageously, at least two flexible, electrical conductors, such as conductive printed circuits or tracks, are fixed to the flexure spring and are electrically isolated therefrom and from each other, and through such electrical conductors, electric current is supplied to a pair of electrical terminals of the moveable current coil of the electric motor.

In one aspect of the present invention, the moveable assembly includes a moveable cylinder fixed to the inner hub of the integrated flexure spring and circuit. The moveable cylinder is thus suspended and centered within the housing by the integrated flexure spring and circuit. The moveable cylinder surrounds a central piston fixed within the housing. The variable volume compression chamber is formed between the piston and the cylinder, and the working fluid within the chamber is compressed responsive to the reciprocation of the moveable assembly because of relative displacement between the piston and the cylinder.

In another aspect of the present invention, the moveable assembly includes a moveable piston fixed to the inner hub of the integrated flexible spring and circuit, and suspended thereby within the housing. As the piston is reciprocated, a free end of the piston compresses the working fluid within the variable volume compression chamber.

The foregoing objects of the present invention are also achieved by a reciprocating compressor adapted to be responsive to an electric current applied to a fixed terminal of the reciprocating compressor. The reciprocating compressor includes a housing and a reciprocating electric motor within the housing. The electric motor includes components fixed within the housing and moveable components connected to reciprocate a moveable assembly coacting with at least one variable volume chamber formed within the housing to compress a working fluid supplied to the chamber. A resilient spring is connected between the housing and the moveable assembly to resiliently suspend and center the moveable assembly and the moveable components within the housing. A flexible electrical conductor is fixed to the resilient spring and electrically isolated therefrom to supply the electric current applied to the fixed terminal to an electrical terminal of the electric motor.

The foregoing objects of the present invention are also achieved by an integrated flexure spring and circuit for use in a reciprocating compressor. The integrated flexure spring and circuit includes a substantially planar, resilient flexure spring having an outer rim, an inner hub and a resilient support member coupled between the outer rim and the inner hub. The integrated flexure spring also includes a flexible, electrical conductor fixed to the flexure spring and electrically isolated therefrom.

The foregoing objects of the present invention are also achieved by a method of operating a reciprocating compressor for compressing a working fluid, wherein the reciprocating compressor includes a housing and a moveable assembly reciprocated with an electric motor disposed in the housing. The method includes positioning and centering the moveable assembly axially and radially within the housing with a resilient spring. The method also includes supplying an electric current to the electric motor with the resilient spring.

Still other objects and advantages of the present invention will become readily apparent to those skilled in the art from the following detailed description, wherein the preferred embodiments of the invention are shown and described, simply by way of illustration of the best mode contemplated of carrying out the invention. As will be realized, the invention is capable of other and different embodiments, and its several details are capable of modifications in various obvious respects, all without departing from the invention. Accordingly, the drawings and description thereof are to be regarded as illustrative in nature, and not as restrictive.

BEST MODE FOR CARRYING OUT THE INVENTION

Figure 4:
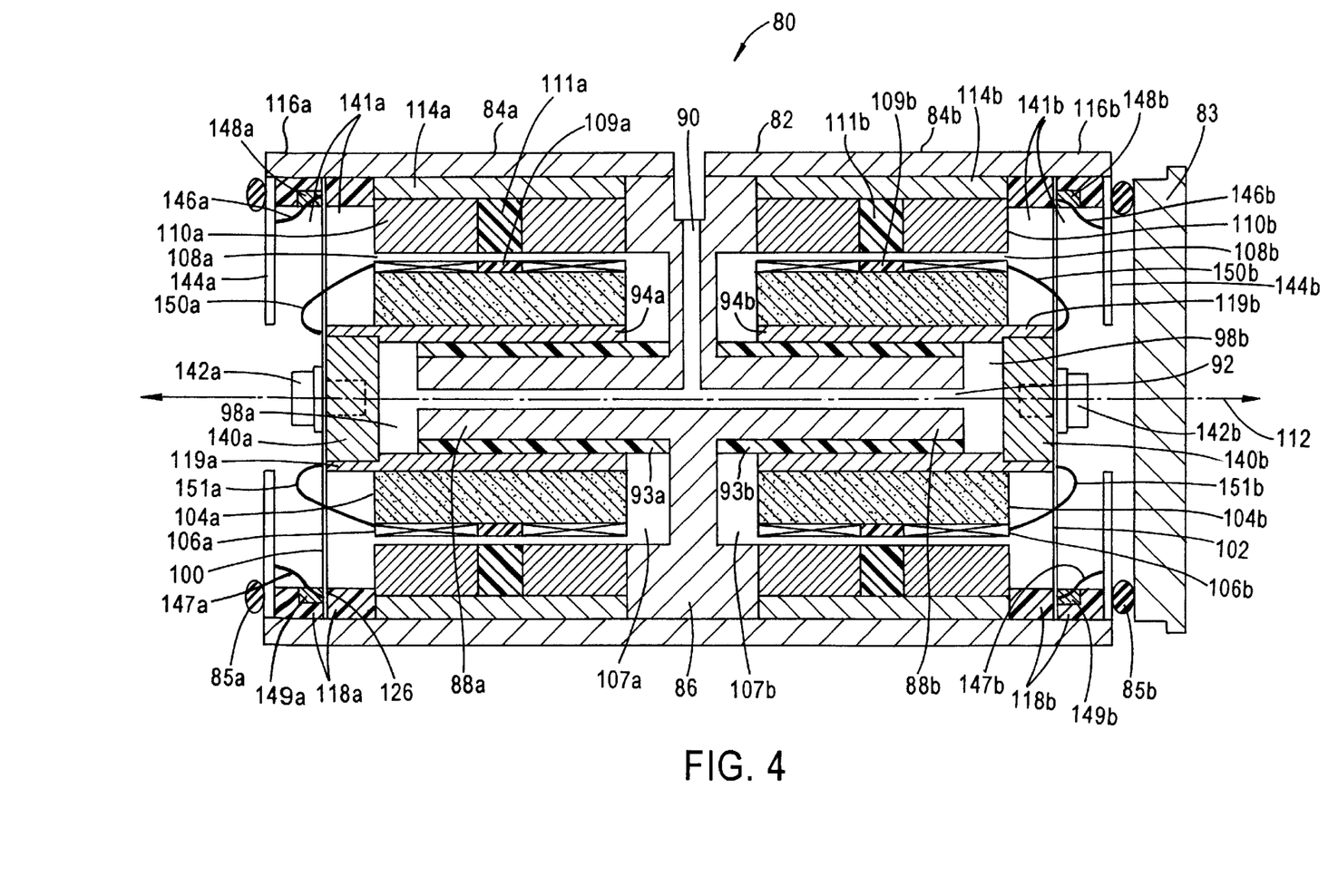
FIG. 4 is a cross-sectional longitudinal view of an embodiment of a reciprocating compressor in accordance with the present invention.

FIG. 4 is an illustration of a preferred embodiment of a reciprocating compressor 80 constructed in accordance with the principles of the present invention. Terms such as "left" and "right" are used herein for convenience, and such terms should be construed in a relative sense. Reciprocating compressor 80 includes a cylindrical, pressurized motor housing 82 having a first or left housing section 84a and a second or right housing section 84b of preferably mirror image construction to each other. Housing 82 is made from a metal, preferably aluminum. Note that similar, i.e., corresponding, components within first and second housings 84a,84b are identified with like reference numerals containing the respective further designations "a" and "b". An end cap 83 and a sealing ring seal 85b seal housing 84b, and similarly, an end cap, not shown, and a sealing ring 85a seal housing 84a. End cap 83 is made from a metal, preferably aluminum, and sealing rings 85a,85b are made from a rubber composition.

A fixed central piston 86, fixed at a periphery thereof to housing 82, includes a cylindrically shaped first piston end 88a and a cylindrically shaped second piston end 88b disposed respectively within housing sections 84a,84b and in fluid communication with a transversely, i.e., radially, extending discharge passage or through bore 90 through an axial through bore 92. Piston 86 is made from a metal, preferably aluminum, and in one embodiment, the piston is integrally formed with housing 82, e.g., the housing and fixed piston can be machined from a single block of aluminum. A plastic sleeve or spacer 93a and a plastic sleeve or spacer 93b are fixed to respective outer surfaces of fixed piston ends 88a,88b.

A moveable cylinder 94a and a moveable cylinder 94b respectively are adjacent to and concentric with fixed plastic sleeves 93a,93b and fixed piston ends 88a,88b to respectively define a compressor chamber 98a and a compressor chamber 98b there between. Moveable cylinders 94a,94b are made from a nonmagnetic metal, such as non-magnetic stainless steel. A cylindrically-shaped inner surface of each of moveable cylinders 94a,94b forms a clearance seal with an opposing, outer bearing surface of a respective one of fixed plastic sleeves 93a,93b, i.e., the inner surfaces of the moveable cylinders are in respective sliding and fluid sealing contact with the outer bearing surfaces of the plastic sleeves. Each of cylinders 94a,94b is reciprocated with a linear motor to alternately compress a working fluid within respective compression chambers 98a,98b. Alternate compression of the working fluid is a result of electrically induced deflection of a unique integrated flexure spring and circuit, a pair of which are generally designated with respect to reference numerals 100 and 102, operatively attached to a linear motor for movement therewith.

Still with reference to FIG. 4, a first linear motor disposed within first housing section 84a includes a cylindrically-shaped moveable armature 104a, made from a ferromagnetic material, which is fixed to an outer surface of associated cylinder 94a. A moveable current coil 106a is in turn attached to an outer surface of moveable armature 104a and defines an air gap 108a with an inner surface of a cylindrical, i.e., ring-shaped, inner fixed magnet 110a. Moveable current coil 106a includes a pair of electrically coupled coil windings axially spaced by a plastic, ring-shaped spacer 109a fixed to the outer surface of moveable armature 104a. The axially spaced coil windings are wound in opposite directions, e.g., in respective clockwise and counterclockwise directions, about moveable armature 104a. A second linear motor within housing section 84b includes likely, i.e., mirror image, components. Moveable current coils 106a,106b are electrically connected in parallel.

With the foregoing construction, moveable cylinders 94a, 94b with respective moveable armatures 104a,104b and respective moveable current coils 106a,106b respectively form a first moveable assembly and a second moveable assembly suspended within respective motor housing sections 84a,84b for reciprocating axial displacement along a longitudinal axis 112 of motor housing 82. A pair of axial clearance gaps 109a,109b between radially extending portions of fixed piston 86 and respective end faces of the first and second moveable assemblies permit reciprocating movement of the moveable assemblies through a distance equal to the axial clearance of the gaps.

Inner fixed magnet 110a is fixed to an inner surface of a cylindrically-shaped, ferromagnetic, outer pole piece 114a of the first linear motor. Outer pole piece 114a is in turn fixed to an inner surface of first housing section 84a. Inner fixed magnet 110a includes a pair of radially polarized ring magnets, axially spaced by a plastic spacer 111a. Fixed magnet 110a and outer pole piece 114a together form a magnet assembly surrounding moveable current coil 106a. Similar components are disposed within second housing section 84b. Each magnet assembly is positioned sufficiently close to an associated one of moveable current coils 106a, 106b within associated first and second housing sections 84a,84b, to facilitate magnetic coupling between the magnet assemblies and the moveable current coils when the coils carry motor drive current therein. The small clearance or air gaps 108a,108b between the magnet assemblies and associated moveable current coils 106a,106b permit frictionless relative movement.

Figure 7:
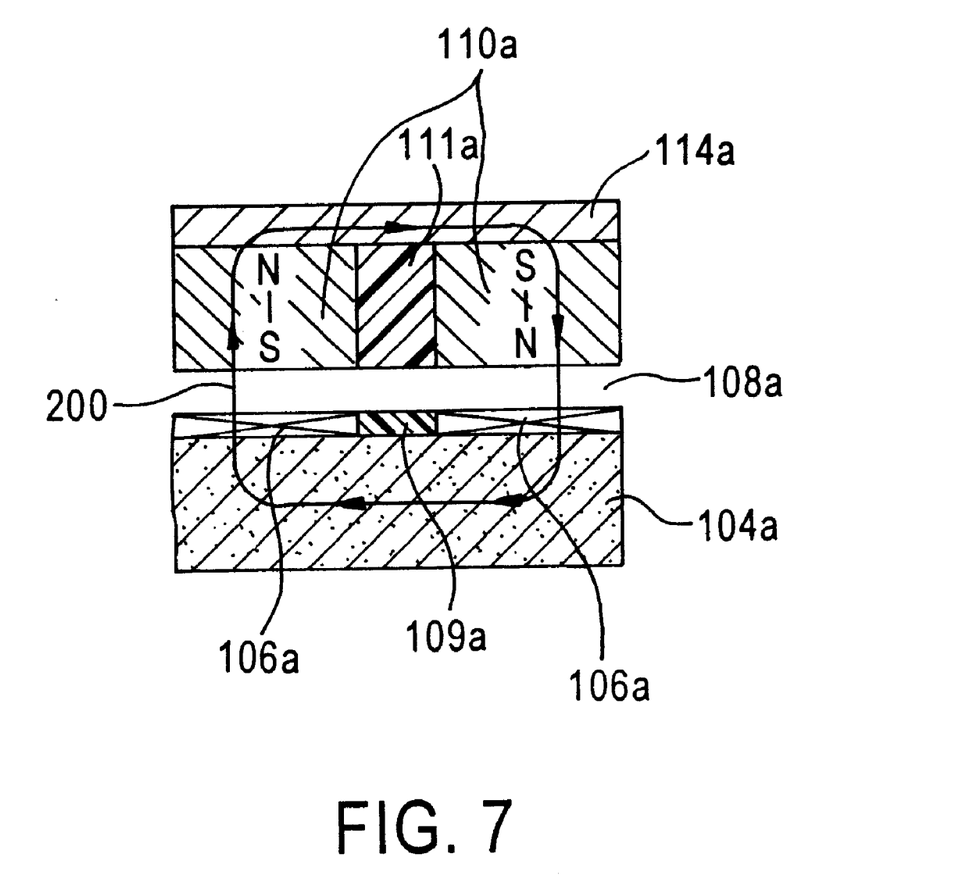
FIG. 7 is a cross-sectional longitudinal view of a first linear motor of the reciprocating compressor of FIG. 4.

The magnetic circuit formed within the first linear motor is depicted in FIG. 7. In the motor, the spaced ring magnets of fixed magnet 110a are radially polarized in opposite North (N)—South (S) directions. Magnetic flux circulates through the components of the linear motor in a clockwise direction along a circuitous flux path 200, as follows:

1) along the axial length of moveable armature 104a;
2) radially across a left one of the spaced pair of oppositely wound coil windings of moveable current coil 106a, air gap 108a, and a corresponding left one of the spaced ring magnets of fixed magnet 110a;
3) along the axial length of outer pole piece 114a; and
4) radially across a right one of the spaced ring magnets, air gap 108a, and a corresponding right one of the pair of coil windings.

A magnetic interaction between the magnetic flux and the electrical currents carried by the pair of coil windings in directions perpendicular to the direction of magnetic flux intersecting the windings, i.e., perpendicular to the plane of FIG. 7, induces an axially directed magnetic motor force on the coil windings. For a predetermined size and weight of the linear motor, radial polarization of fixed magnet 110a, as compared to an alternative, such as axial polarization thereof, advantageously maximizes the magnetic flux density crossing air gap 108a and intersecting the spaced coil windings of moveable current coil 106a. Such radial polarization thus leads to a more compact, lower weight configuration for reciprocating compressor 80; an important consideration for airborne applications of the compressor.

Referring back to FIG. 4, an important and advantageous feature of the reciprocating compressor 80 is integrated flexure spring and circuit 100 fixedly mounted along its outer periphery within an end 116a of housing 82. Similarly, integrated flexure spring and circuit 102 is fixedly mounted along its outer periphery within an end 116b of housing 82. As depicted in FIG. 4, springs 100,102 are mounted parallel to each other with a pair of spring supports 118a and a pair of spring supports 118b, respectively. Spring supports or mounts 118a,118b are electrically insulating and preferably made from a plastic-reinforced glass composition. Axially spaced spring supports 118a,118b, are attached to respective inner surfaces of housing ends 116a,116b, with the associated spring periphery sandwiched there between. A hub 120 (see FIG. 5A) formed in the center of spring 100 is attached to an extended end portion 119a of cylinder 94a, and similarly, a hub 120 formed in the center of spring 102 is attached to an extended end portion 119b of cylinder 94b. In this manner, springs 100,102 respectively center and suspend the first and second moveable assemblies, i.e., associated moveable cylinders 94a,94b, moveable armatures 104a, 104b, and moveable current coils 106a,106b fixed thereto, for reciprocating axial displacement thereof. As described in detail below, springs 100,102 align the respective first and second moveable assemblies in both axial and radial directions within motor housing 82.

Figures 5A, 5C:
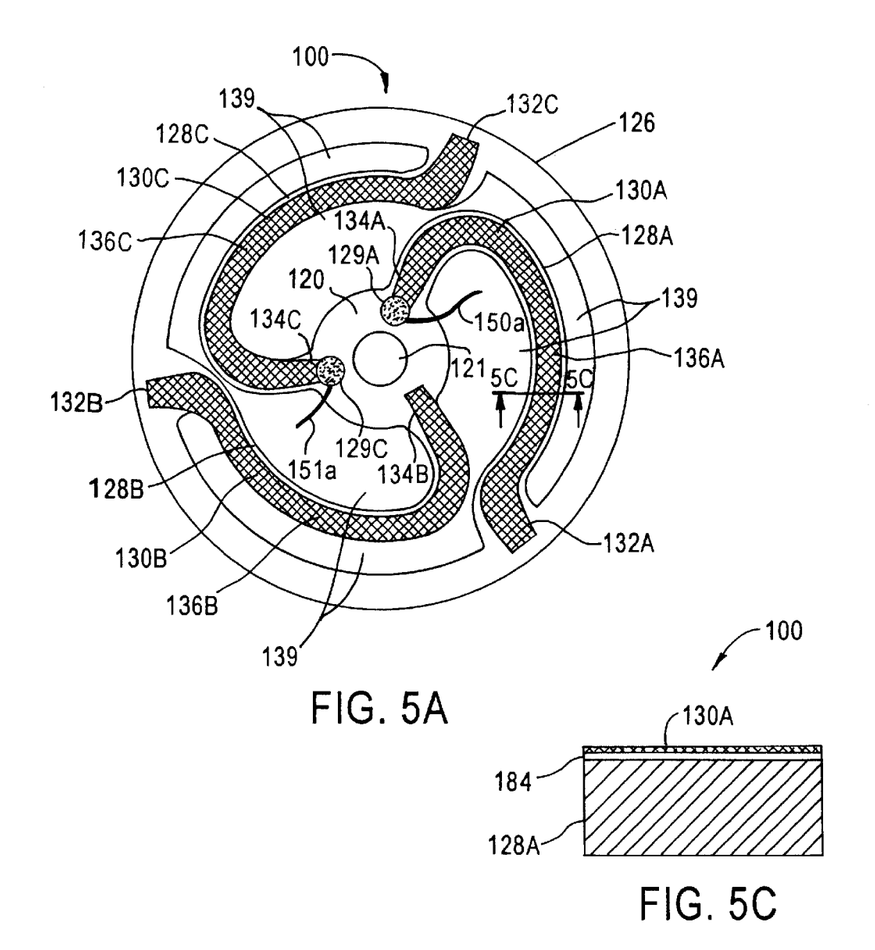
FIG. 5A is an elevational front view of an embodiment of an integrated flexure spring and circuit in accordance with the present invention.
FIG. 5C is a cross-sectional view of a layered construction of the integrated flexure spring and circuit of FIG. 5A.
Figure 5B:
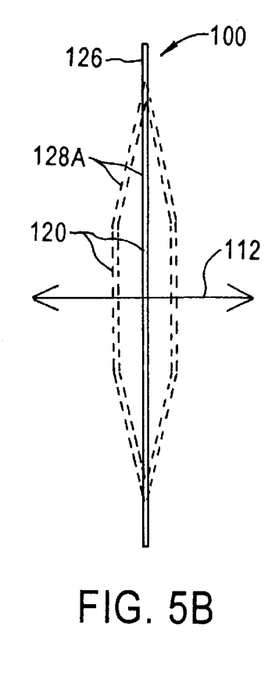
FIG. 5B is an elevational top view of the integrated flexure spring and circuit of FIG. 5A.

More specifically, with particular reference to FIGS. 5A, 5B and 5C, spring 100 (and spring 102) is in the form of a substantially planar flexure spring, made from spring steel, having an annular outer rim portion 126, inner hub portion 120, and a resilient support member coupled between the outer rim and inner hub. Inner hub portion 120 includes a central through aperture 121. The resilient support member includes a plurality of resilient spring arms 128A, 128B and 128C coupled between outer rim 126 and inner hub 120, and extending in both circumferential and radial directions there between (the designations "A"–"C" distinguish like components of the one spring, and are not to be confused with the designations "a","b" used to distinguish like components within housings sections 84a,84b). A plurality of through apertures 139 separate resilient spring arms 128A–128C, inner hub 120 and outer rim 126.

A plurality of flexible, electrically conductive printed circuits or tracks 130A, 130B and 130C, preferably made from beryllium copper, are respectively fixedly applied, i.e., bonded, to electrically insulated surfaces of spring arms 128A–128C. An electrically insulating layer 184 (FIG. 5C) bonded to a surface of each spring arm 128A–128C of the flexure spring ensures printed circuits 130A–130C are each electrically isolated from the underlying flexure spring and from each other. Electrically insulating layer 184 is preferably made from a plastic composition. Printed circuit or track 130A includes an outer terminal portion 132A coincident with a portion of outer rim 126, an inner terminal portion 134A coincident with a portion of inner hub 120, and a track portion 136A traversing a length of resilient spring arm 128A between outer and inner terminal portions 132A and 134A. Printed circuits 130B and 130C include similarly arranged terminal and track portions.

For reasons more fully discussed later, a solder joint 129A joins a first end of an electrical inner lead 150a to inner terminal portion 134A of printed circuit 130A. Similarly, a solder joint 129C joins a first end of an electrical inner lead 151a to inner terminal portion 134C of printed circuit track 130C. On the single integrated flexure spring and circuit 100 (and similarly on spring 102), a pair of electrically isolated, conductive paths are thus established between leads 150a, 151a and respective outer terminal portions 132A,132C of respective printed circuits 130A,130C. In the preferred embodiment, integrated flexure spring and circuit 100 includes at least two spring arms and at least two corresponding printed circuits or tracks for establishing at least two electrically isolated conductive paths. The third printed circuit, e.g., printed circuit 130B of spring 100 (and 102), enhances flexibility in assembling reciprocating compressor 80. For instance, spring 100 can be rotated as necessary to align any two of the three outer terminal portions 132A–132C with a corresponding pair of fixed terminals of reciprocating compressor 80, during assembly thereof.

Numerous alternative arrangements of the resilient support member are possible, such alternative arrangements being determined by the required properties of the integral spring device. For example, each resilient support arm of the resilient support member can be substantially radially directed, spiral-like, or can follow a serpentine path between outer rim 126 and inner hub 120. Also, the number and widths of the support arms can be varied. Correspondingly, numerous alternative arrangements of the flexible printed circuit component are also possible. The arrangement of the electrically conductive tracks, i.e., the number, widths, and locations of the electrically conductive tracks can be varied to suit the requirements of a particular application or use of spring 100.

In another embodiment of the present invention, an electrically conductive wire or cable, or other flexible conductor, is integrally bonded to the surface of the spring arm. In even another embodiment, the electrically conductive flexible printed circuit, wire or cable can be substantially encased or embedded within spring 100, with only inner and outer terminal portions thereof exposed at the surface of spring 100 for electrical connection.

As mentioned above and with reference again to FIG. 4, outer rim 126 of spring 100 is secured to housing end 116a of the housing 82 by a pair of annular spring mounts 118a. The spring 100 is thus coupled to the housing end 116a of housing 82 so as to extend across housing end 116a in a transverse planar direction, with an exterior surface of spring 100 having the printed circuit applied thereto facing away from an interior of the motor housing. Opposite first piston end 88a, a bolt 142a, inserted through central aperture 121 of inner hub 120 of spring 100, secures a compression plug 140a to an interior surface of the spring at the inner hub thereof. Compression plug 140a is made from a non-magnetic metal; preferably non-magnetic stainless steel. Extended end portion 119a of cylinder 100 surrounding compression plug 140a is also fixed to the interior surface of spring 100 at inner hub 120 thereof. In this manner moveable cylinder 94a is suspended within first housing section 84a by spring 100. Variable volume compression space 98a in fluid communication with axial through bore 92 is formed between first piston end 88a and compression plug 140a.

Spring 102 is similarly coupled to and extends transversely across housing end 116b of motor housing 82. Since components within the second housing correspond to the aforementioned components in the first housing, moveable cylinder 94b is suspended within second housing section 84b by spring 102. Springs 100,102 center and suspend respective moveable cylinders 94a,94b and thus, the first and second moveable assemblies within motor housing 82. A pair of clearance gaps 141a and a pair of clearance gaps 141b respectively straddle springs 100,102 and permit interference-free reciprocation thereof.

The first linear motor, including moveable current coil 106*a* and the associated fixed magnet assembly, axially displaces the first moveable assembly suspended within first housing section 84*a*. Similarly, the second linear motor, including moveable current coil 106*b* and the associated fixed magnet assembly, axially displaces the second moveable assembly suspended within second housing section 84*b*. The first linear motor is driven responsive to a sinusoidal, i.e., alternating, motor drive current supplied from an external current source, not shown, to a circuit board 144*a* secured to first end 116*a* of motor housing 82. The particulars of the external current source are known in the art and are not important to the inventive concept of the present invention, so long as the motor drive current supplied thereby produces the required reciprocating displacement of the moveable assembly. A pair of short, electrical outer leads 146*a*,147*a* carry the motor drive current (supplied to circuit board 144*a* from the external current source) from circuit board 144*a* to a respective pair of electrical housing terminals 148*a*,149*a* fixed to a periphery of first end 116*a* of motor housing 82, i.e., fixed within spring mounts 118*a*.

Housing terminals 148*a*,149*a* are in registration and electrical contact with respective outer terminal portions 132A, 132C (FIG. 5A) of respective electrically conductive tracks 130A,130C of spring 100. A pair of short, flexible electrical inner leads 150*a*,151*a*, which can be, for example, a pair of wires or flat cables, electrically couple respective inner terminal portions 134A,134C (of respective tracks 130A, 130C) at inner hub 120 of spring 100, to a respective pair of electrical terminals of moveable coil 106*a*. More specifically and as previously described, the first ends of inner leads 150*a*,151*a* are soldered to respective inner terminal portion 134A,134C of spring 100 to effect electrical connections thereto, while a second end of each of inner leads 150*a*,151*a* is connected to a respective one of the pair of electrical terminals of moveable current coil 106*a*. In this manner, electrically isolated, conductive paths are respectively established between housing terminals 148*a*,149*a* and the electrical terminals of moveable current coil 106*a* through respective electrically conductive tracks 130A,130C applied to the exterior surface of spring 100 (and through respective inner leads 150*a*,151*a*).

In the preferred embodiment, the electrical coupling arrangement just described with respect to components within first housing section 84*a* is replicated within second housing section 84*b*, as depicted in FIG. 4. Therefore, a duplicative textual description of the electrical coupling arrangement within second housing 84*b* is herein omitted for the sake of descriptive brevity and clarity. However, it is to be understood in the following operational description that springs 100,102 are arranged and operate similarly in respective housing sections 84*a*,84*b*, e.g., motor drive current is supplied from the external source to moving coil 106*b* via spring 102 in the same manner as motor drive current is supplied from the external source to moving coil 106*a* via spring 100.

In operation, the external source of current supplies a sinusoidal motor drive current to moveable coils 106*a*,106*b* of the respective first and second linear motors through respective springs 100,102, as described above. Each moveable assembly is displaced from an initial rest position, i.e., the neutral or centered position depicted in FIG. 5, in first and second opposing axial directions against a restoring force of a respective one of springs 100,102 responsive to a respective axial force exerted on each moveable assembly.

As previously described, the axial force results from a magnetic interaction induced between the magnet assembly and the moveable current coil of the moveable assembly when the motor drive current is supplied to the electrical terminals of the moveable current coil. Because of the mirror-image arrangement of components within first and second housing sections 84*a*,84*b*, the first and second moveable assemblies (in the respective first and second housing sections) reciprocate in anti-phase or opposite axial directions, i.e., the moveable assemblies are axially displaced 180° out of phase with respect to each other. As compression plugs 140*a*,140*b* fixed to the respective inner hubs of springs 100,102 axially reciprocate along with the respective moveable assemblies, a volume of each respective compression space 98*a*,98*b* alternately expands and contracts since first and second piston ends 88*a*,88*b* are fixed within the motor housing 82. The typically gaseous working fluid occupying the compression spaces 98*a*,98*b* is thus alternately displaced from the compression spaces into and through axial and exit through bores 92,90 within piston 86.

During reciprocating operation of spring 100 (and spring 102), outer rim 126 is stationary while inner hub 120 reciprocates in the axial direction responsive to a driving force applied to inner hub 120, i.e., inner hub 120 is displaced by an axial force from an initial rest position in a transverse plane (depicted in FIG. 4, and by the solid lines in FIG. 5B) in first and second opposing axial directions (depicted by the arrows at either end of central axis line 112) against a restoring force of the resilient support member, i.e., of each of resilient spring arms 128A–128C. As depicted in FIG. 5B, outer rim 126 and inner hub 120 remain, for the most part, flat and parallel during operation, while each of resilient spring arms 128A–128C bends out of the initial rest position to accommodate the axial displacement of inner hub 120, e.g., to the dashed line positions indicated in FIG. 5B. The planar construction of spring 100 naturally biases each of resilient spring arms 128A–128C against the axial displacement of inner hub 120 away from the initial rest position, and thus, each resilient spring arm exerts a restoring force toward the initial rest position whenever the inner hub is so displaced. A preferable peak amplitude of axial displacement of hub 120 from the rest position is approximately $2/10$ of an inch, i.e., a peak amplitude of $2/10$ of an inch in each opposing axial direction, for a total peak-to-peak amplitude of $4/10$ of an inch. Such displacement limits bending or flexing induced in any localized area of the electrically conductive printed circuit, and thus, drastically reduces stress related failure of the printed circuit.

The magnitude of the restoring force is determined by an axial stiffness of the spring 100. Additionally, spring 100 is constructed to have a radial, i.e., transverse, stiffness that is substantially greater than the axial stiffness of the spring 100. These attributes of spring 100, also shared by flexure spring 102, are necessary in order to achieve the axial and radial alignment of the moveable assemblies to within required operational tolerances.

In reciprocating compressor 80, springs 100,102 perform two critical functions. First, springs 100,102 respectively locate the first and second moveable assemblies and the moveable components of the first and second linear motors (i.e., moveable coils 106*a*,106*b*) within motor housing 82 both axially and radially. Second, springs 100,102 and specifically, electrically conductive tracks 130A–130C applied thereto, serve as part of a current coupling mechanism through which motor drive current is transferred between the external source of motor drive current and respective moveable current coils 106*a*,106*b*. Advantages of reciprocating compressor 80 realized through use of springs 100,102 therein include the following:

1) a single spring accommodates a pair of isolated, electrically conductive printed circuits for conducting motor drive current to an associated moveable current coil;

1) additional motor drive current conduction paths can be advantageously located on a single integrated spring and circuit as the need arises, obviating the need for additional, failure prone electrical leads as used in the prior art reciprocating compressor of FIG. 1;

3) operational reliability is enhanced as compared to the prior art reciprocating compressor of FIG. 1 since deflection of inner lead 150a (and 150b) and stresses in terminal locations are minimized. Deflection of inner lead 150a is minimized because both ends thereof, i.e., the end connected to inner hub 120 of spring 100 and the other end connected to the electrical terminal of the moveable current coil 106a, are displaced in unison as the moveable assembly reciprocates and thus, relative motion between the ends of the lead is non-existent or minimal;

4) for a predetermined axial displacement of the moveable assembly within motor housing 82, fewer parts and less space are required as compared to the prior art motor of FIG. 3, since the plurality of coil spring are not required in miniature reciprocating compressors, such space savings translate to an advantageous reduction in the size of the reciprocating compressor;

5) springs 100,102 are typically less expensive than an equivalent number of conductive coil springs, i.e., the number of coil springs needed to fulfill the functionality provided by the integral spring device; and 6) the improvement in radial support provided by springs 100,102 as compared to the coil springs reduces side loading on and friction wear of moveable parts of the linear motor, thus leading to a greater operational life and mean time between failure for the linear motor.

Figure 6:
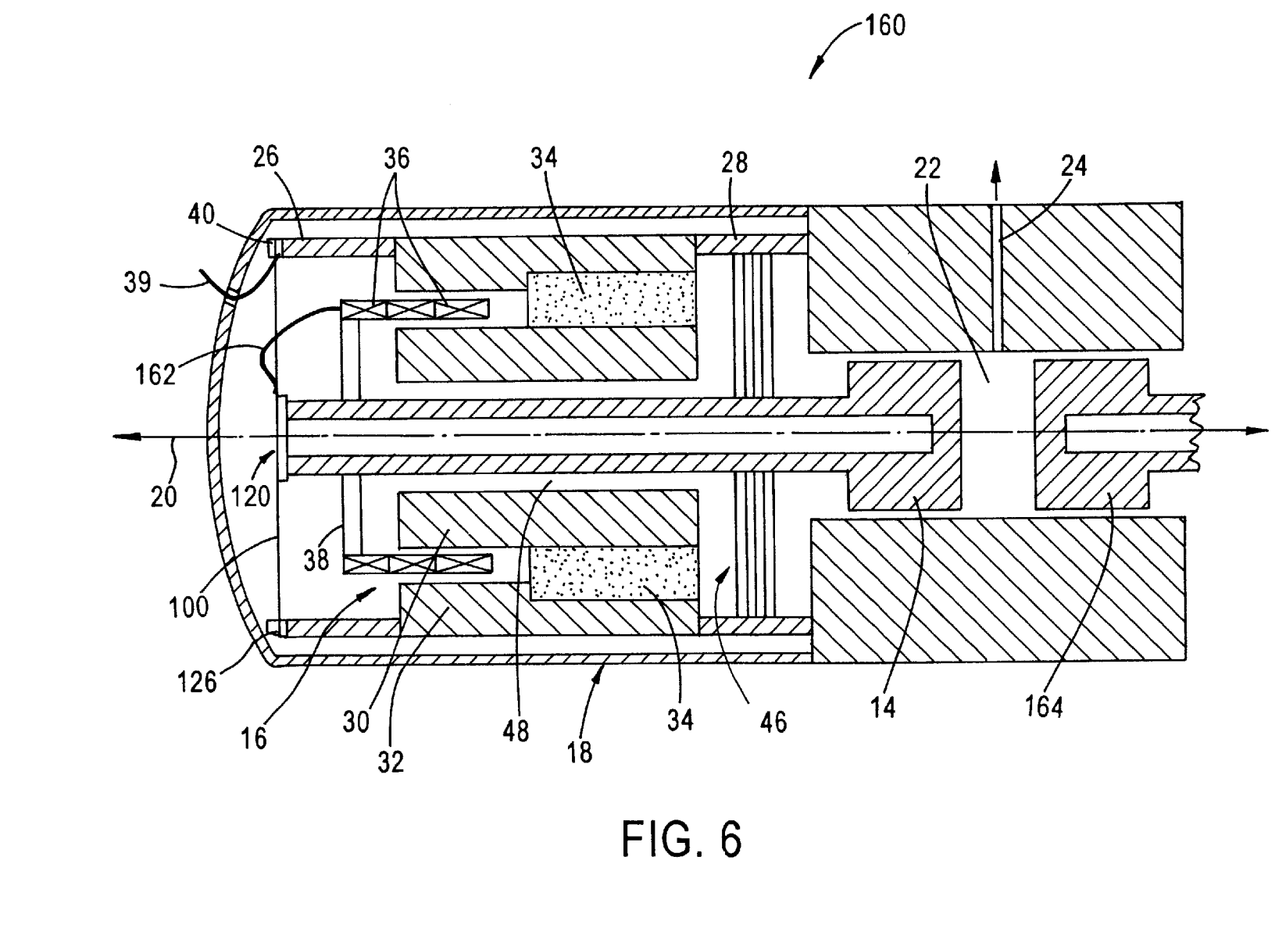
FIG. 6 is a cross-sectional longitudinal view of an alternative embodiment of a reciprocating compressor in accordance with the present invention.

As previously described, reciprocating compressor 80 of FIG. 4 includes moveable cylinders 94a,94b and a fixed piston 86. However, another embodiment of the reciprocating compressor of the present invention is depicted in FIG. 6, wherein reciprocating compressor 160 includes a moveable rather than a fixed piston. The construction, arrangement and operation of the reciprocating compressor of FIG. 6 are similar in some aspects to the prior art reciprocating compressor of FIG. 1, with a significant distinction and improvement; flexure bearing 44 of prior art reciprocating compressor 10 of FIG. 1 is replaced in the reciprocating compressor 160 of FIG. 6 by spring 100. Advantageously, the incorporation of spring 100 obviates the need for failure prone inner lead 42 between fixed terminal 40 and moveable current coil 36.

In FIG. 6, outer rim 126 of spring 100 is secured to left housing mount 26 while inner hub 120 of spring 100 is fixed to a left end of piston 14. Electrical terminal 40 is in registration and electrical contact with outer terminal portion 132A of electrically conductive track 130A, at outer rim 126 of spring 100. An electrical connection between electrical terminal 40 and an electrical terminal of moveable current coil 36 via an inner lead wire 162 is constructed in the same manner as described in connection with reciprocating compressor 80 of FIG. 4. In this manner, an electrically conductive path is established between electrical terminal 40 and the electrical terminal of moveable current coil 36 through electrically conductive track 130A applied to the exterior surface of spring 100, and inner lead 162. It is to be understood that another electrical coupling arrangement, not shown, similar to the arrangement just described, supplies current to another electrical terminal of current coil 36 through electrically conductive track 130C, to complete an electrical current path between current coil 36 and the external source of current.

In operation, the external source of current supplies a motor drive current to the linear motor through outer lead 39, electrical terminal 40, electrically conductive track 130A applied to the exterior surface of spring 100, and inner lead 162. The moveable assembly is displaced from an initial rest position, i.e., a neutral or center position depicted in FIG. 6, in first and second opposing axial directions against a restoring force of spring 100 and an associated restoring force of flexure bearing 46, responsive to an axial force exerted on the moveable assembly. The axial force results from a magnetic interaction between fixed magnet 34 and moveable current coil 36, when the motor drive current is supplied 25 to the electrical terminals of moveable current coil 36. As the piston axially reciprocates, the working fluid within chamber 22 is compressed and displaced through exit passageway 24. It should be appreciated that an opposing piston 164 is suspended within the right half of the motor housing by an associated integral spring device (and flexure bearing), and is similarly driven by an associated linear motor.

In an alternative arrangement of the embodiment of reciprocating compressor 80 of FIG. 4, wherein the moveable current coils are not electrically connected together, each of the first and second moveable assemblies occupying respective housing sections 84a,84b can be independently driven by the respective first and second linear motors. In this arrangement, each of moveable current coils 106a,106b is independently supplied with an electric current from an external source.

The laminated or layered cross-sectional construction of spring 100 is depicted in FIG. 5C. The layered construction includes a resilient or springy base layer, corresponding to spring arm 128A, made from spring steel. An exemplary thickness of the base layer is approximately $^{12}/_{1000}$ of an inch. Applied to an upper surface of the resilient base layer is an electrically insulating layer 184, which is made from a plastic. As previously described, applied or bonded to an upper surface of insulating layer 184 is the thin, flexible, electrically conductive layer, corresponding to electrically conductive track 130A. The conductive layer is made from a flexible, suitably durable, conductive material; preferably beryllium copper. A preferred thickness of the conductive layer is in the approximate range of three to four thousandths of an inch. Since spring 100 is a composite of three layers fixed together, i.e., the spring steel base layer, plastic insulating layer 184, and the conductive layer, it is important that each of the three layers exhibit a similar thermal expansion over the operating temperature range of spring 100. Such similarity in thermal expansion minimizes destructive stresses in the spring that would otherwise arise from disparate thermal expansion between the three layers.

A method of manufacturing or producing the layered construction includes the following steps:

1) establishing a substantially planar, resilient base layer formed of the resilient or springy material, and having a configuration corresponding to that of the flexure spring. This step can be achieved through a chemical milling step;

2) applying electrically insulating layer 184 to an upper surface of the resilient base layer;

3) depositing an electrically conductive layer on the electrically insulating layer in accordance with a predetermined pattern, the pattern establishing, for example, the configuration of the flexible printed circuits of spring 100; and 4) removing exposed portions or regions of electrically insulating layer 184, such as those portions not covered by the electrically conductive layer. This step in the method can be effected through chemical etching.

Since the integrated flexure spring and circuit is fabricated with chemical milling operations instead of mechanical deformation steps, the resulting integral spring device is advantageously produced with virtually no residual stresses therein. This increases the reliability and extends the operational life of the integrated flexure spring and circuit.

In another method of producing the integrated flexure spring and circuit, a flexible electrically conductive wire or cable is bonded to electrically insulating layer 184 instead of the printed circuit. In even another method of producing the integrated spring and circuit, the printed circuit, wire or cable, is embedded within the laminated or layered structure with only inner and outer terminal portions thereof exposed at the surface of the spring for connection with the motor terminals and inner leads of the linear motor.

It will be readily seen by one of ordinary skill in the art that the present invention fulfills all of the objects set forth above. After reading the foregoing specification, one of ordinary skill will be able to affect various changes, substitutions of equivalents and various other aspects of the invention as broadly disclosed herein. It is therefore intended that the protection granted hereon be limited only by the definition contained in the appended claims and equivalents thereof.

What is claimed is:

1. A reciprocating compressor adapted to be responsive to an electric current applied to a fixed terminal of the reciprocating compressor, comprising:

a housing;

a reciprocating electric motor including components fixed within said housing and moveable components connected to reciprocate a moveable assembly coacting with at least one variable volume chamber formed within said housing to compress a working fluid supplied to said chamber;

a resilient spring connected between said housing and said moveable assembly to resiliently suspend and center said moveable assembly and said moveable components within said housing; and, a flexible, electrically conductive printed circuit fixed to said resilient spring to supply the electric current applied to the fixed terminal to an electrical terminal of the electric motor.

2. The reciprocating compressor of claim 1, wherein:

said resilient spring is constructed and arranged to center said moveable assembly within said housing in radial and axial directions, and said moveable assembly is displaced from an initial position in first and second opposing axial directions against a restoring force of said resilient spring responsive to an axial force exerted on said moveable assembly by said electric motor when the electric current is supplied to the fixed terminal.

3. The reciprocating compressor of claim 2, wherein said resilient spring includes a substantially planar, resilient flexure spring extending across said housing in said radial direction, and wherein said printed circuit is electrically coupled between the fixed terminal and said electrical terminal of said electric motor.

4. The reciprocating compressor of claim 3, wherein said resilient spring includes:

an outer rim fixed to a periphery of said housing, an inner hub fixed to an end of said moveable assembly, and a resilient support member coupled between said outer rim and said inner hub, said resilient support member providing said restoring force when said inner hub and said moveable assembly fixed thereto are displaced in said first and second axial directions.

5. The reciprocating compressor of claim 4, wherein said printed circuit is electrically isolated from said resilient spring.

6. The reciprocating compressor of claim 5, wherein said printed circuit is applied to an electrically insulating surface of said resilient spring.

7. The reciprocating compressor of claim 6, wherein said printed circuit includes:

an outer terminal portion coincident with said outer rim and electrically coupled to the fixed terminal, an inner terminal portion, and a portion coincident with said resilient support member and connecting said inner and outer terminal portions.

8. The reciprocating compressor of claim 7, wherein said outer terminal portion and the fixed terminal are coincident, and said inner terminal portion and said inner hub are coincident.

9. The reciprocating compressor of claim 8, wherein said resilient support member includes first and second resilient spring arms coupled between said outer rim and said inner hub, and said printed circuit traverses a length of said first resilient spring arm.

10. The reciprocating compressor of claim 4, wherein said printed circuit includes:

an outer terminal portion coincident with the outer rim of said resilient spring and electrically coupled to the fixed terminal, an inner terminal portion, and a portion connecting said outer terminal portion and said inner terminal portion.

11. The reciprocating compressor of claim 2, wherein said electric motor includes a current coil adapted to be displaced with said moveable assembly, said current coil having an electrical terminal electrically coupled to said printed circuit of said resilient spring, and a magnet assembly fixed within said housing, said axial force resulting from a magnetic interaction induced between said magnet assembly and said current coil when the electric current is supplied to the fixed terminal.

12. The reciprocating compressor of claim 11, wherein said current coil includes first and second axially spaced current coil windings, and said magnet assembly includes first and second axially spaced ring magnet assemblies for respective magnetic interaction with said first and second current coil windings, said first and second ring magnet assemblies being respectively magnetically polarized in opposing radial directions.

13. The reciprocating compressor of claim 11, wherein said moveable assembly includes:

a cylinder extending along an axis of said housing, said cylinder having an end fixed to said resilient spring, and said current coil, said current coil at least partially surrounding said cylinder.

14. The reciprocating compressor of claim 9, wherein an electrical lead is coupled between said electrical terminal of said motor and said inner terminal portion of said printed circuit applied to said resilient spring.

15. The reciprocating compressor of claim 14, wherein first and second flexible, electrically conductive printed circuits are respectively applied to electrically insulating surfaces of said first and second spring arms to electrically isolate said first and second printed circuits from said resilient spring and each other, said first and second printed circuits being respectively, electrically coupled between first and second fixed terminals of said housing and respective first and second electrical terminals of said motor to supply the electric current applied to said first and second fixed terminals to said first and second electrical terminals of said motor.

16. The reciprocating compressor of claim 13, further including a piston fixed within said housing, said piston extending along said axis of said housing and within said cylinder to form said at least one variable volume chamber between said piston and said cylinder, said piston having axial and radial through bores therein, said axial and radial through bores being in fluid communication with each other and with said chamber, whereby the working fluid is displaced from said chamber and through said axial and transverse through bores responsive to a relative axial displacement between said cylinder and said piston.

17. The reciprocating compressor of claim 11, wherein said moveable assembly includes a piston having a portion thereof fixed to said resilient member and suspended thereby to extend along said axis of said housing, said piston having a free end for coacting with said variable volume chamber within said housing, said housing including an exit through bore in fluid communication with said chamber, whereby said working fluid is displaced from said chamber and through said exit through bore responsive to said axial displacement.

18. The reciprocating compressor of claim 1, wherein an opposing pair of said reciprocating electric motors, an associated opposing pair of said resilient springs, and an associated pair of said flexible, electrically conductive printed circuits disposed within said housing cooperate to compress the working fluid within an associated pair of said at least one variable volume chambers, responsive to an application of the electric current to said pair of said electric motors through said pair of said printed circuits.

19. A method of operating a reciprocating compressor for compressing a working fluid, the reciprocating compressor including a housing and a moveable assembly reciprocated with an electric motor disposed in said housing, comprising the steps of:

positioning and centering said moveable assembly radially within said housing with a resilient spring; and supplying an electric current to said electric motor through a flexible, electrically conductive printed circuit fixed to said resilient spring.

20. The method of claim 19, wherein the positioning step further includes the step of positioning and centering said moveable assembly axially within said housing with said resilient spring.

21. The method of claim 19, further including the step of displacing said moveable assembly from an initial position in first and second opposing axial directions against a restoring force of said resilient spring responsive to said step of supplying.

22. The method of claim 20, wherein the step of supplying includes the further step of supplying an electric current to said electric motor through a pair of flexible, electrically conductive printed circuits fixed to and electrically isolated from said resilient spring.

23. An integrated flexure spring and circuit for use in a reciprocating compressor, comprising:

a substantially planar, resilient flexure spring having an outer rim, an inner hub and a resilient support member coupled between said outer rim and said inner hub; and a flexible, electrically conductive printed circuit fixed to said flexure spring.

24. The integrated flexure spring and circuit of claim 23, wherein said inner hub, said resilient support member and said printed circuit are adapted to be displaced from a planar rest position in first and second opposing axial directions against a restoring force of said resilient support member.

25. The device as recited in claim 24, wherein said resilient support member includes at least two resilient support arms resiliently coupling said inner hub to said outer rim.

26. The device as recited in claim 25, wherein said at least two resilient support arms are circumferentially and radially directed between said outer rim and said inner hub.

27. The device as recited in claim 25, wherein said printed circuit includes an outer terminal portion proximate said outer rim, an inner terminal portion proximate said inner hub, and a portion traversing at least one of said plurality of resilient support arms and connecting said outer and inner terminal portions.

28. The device as recited in claim 25, wherein at least two flexible, electrically conductive printed circuits are respectively applied to electrically insulating surfaces of said at least two resilient support arms to electrically isolate said printed circuits from said flexure spring and each other.

* * * * *